United States Patent
Krogh et al.

(10) Patent No.: US 9,051,926 B2
(45) Date of Patent: Jun. 9, 2015

(54) HYDRAULIC AXIAL PISTON MACHINE

(75) Inventors: Kim Loekkegaard Krogh, Soenderborg (DK); Palle Olsen, Nordborg (DK)

(73) Assignee: Danfoss A/S, Nordborg (DK)

( * ) Notice: Subject to any disclaimer, the term of this patent is extended or adjusted under 35 U.S.C. 154(b) by 607 days.

(21) Appl. No.: 12/682,122

(22) PCT Filed: Oct. 8, 2008

(86) PCT No.: PCT/DK2008/000349
§ 371 (c)(1),
(2), (4) Date: Jul. 7, 2010

(87) PCT Pub. No.: WO2009/046716
PCT Pub. Date: Apr. 16, 2009

(65) Prior Publication Data
US 2010/0269687 A1    Oct. 28, 2010

(30) Foreign Application Priority Data

Oct. 9, 2007  (DE) .......................... 10 2007 048 316

(51) Int. Cl.
| F04B 1/32 | (2006.01) |
| F04B 1/20 | (2006.01) |
| B01D 61/06 | (2006.01) |

(52) U.S. Cl.
CPC .............. *F04B 1/324* (2013.01); *F04B 1/326* (2013.01); *F04B 1/2085* (2013.01); *F04B 1/2078* (2013.01); *B01D 61/06* (2013.01); *B01D 2313/246* (2013.01)

(58) Field of Classification Search
CPC ...... F04B 1/2078; F04B 1/2085; F04B 1/324; F04B 1/326; F04B 27/086; F04B 27/0865; F01B 3/106; F01B 3/107; F01B 3/108; F01B 3/109; B01D 2313/246; B01D 61/06

USPC .......... 417/269, 222.1, 216; 92/12.2; 60/487; 74/579 R–588
See application file for complete search history.

(56) References Cited

U.S. PATENT DOCUMENTS

| 1,533,399 A | 4/1925 | Dunlap |
| 1,785,355 A | * 12/1930 | Lawser .......................... 91/505 |

(Continued)

FOREIGN PATENT DOCUMENTS

| AU | 474054 B2 | 3/1975 |
| DE | 574612 | * 4/1933 .............. F04B 1/326 |

(Continued)

OTHER PUBLICATIONS

International Search Report for corresponding International Application No. PCT/DK2008/000349 and its translation dated Feb. 4, 2009. (6 pages).

*Primary Examiner* — Devon Kramer
*Assistant Examiner* — Joseph Herrmann
(74) *Attorney, Agent, or Firm* — McCormick, Paulding & Huber LLP

(57) ABSTRACT

The invention concerns a hydraulic axial piston machine with a housing, in which a cylinder drum having at least one cylinder is arranged to be rotatable around an axis, in which cylinder is located a piston that is supported on a swashplate, whose inclination angle is adjustable in an adjustment plane. It is endeavored to keep the cost of manufacturing individual parts of the axial piston machine small. For this purpose it is provided that on the side facing away from the cylinder drum (4) the swashplate (12) has a spherical bearing surface (15), which rests on a spherical supporting surface (16) in a bottom part (3) of the housing (2) and comprises an inclination protection (31-34), which counteracts an inclination of the swashplate (12) perpendicularly to the adjustment plane.

8 Claims, 2 Drawing Sheets

(56) References Cited

U.S. PATENT DOCUMENTS

| | | | | |
|---|---|---|---|---|
| 1,947,902 A | * | 2/1934 | De Stoutz | 91/485 |
| 2,307,719 A | | 1/1943 | Hawley, Jr. | |
| 3,092,034 A | | 6/1963 | Bartholomaus | |
| 3,221,660 A | * | 12/1965 | D Amato | 417/222.1 |
| 3,396,670 A | * | 8/1968 | Baits | 91/506 |
| 3,554,671 A | * | 1/1971 | Schlinke | 417/222.1 |
| 3,739,692 A | * | 6/1973 | Bell | 91/506 |
| 3,890,882 A | | 6/1975 | Bobier | |
| 4,581,980 A | * | 4/1986 | Berthold | 92/12.2 |
| 4,615,257 A | | 10/1986 | Valentin | |
| 4,916,901 A | * | 4/1990 | Hayashi et al. | 60/489 |
| 4,991,492 A | * | 2/1991 | Bratt et al. | 92/12.2 |
| 5,017,095 A | * | 5/1991 | Burgess et al. | 417/222.1 |
| 5,095,807 A | * | 3/1992 | Wagenseil | 92/12.2 |
| 5,630,707 A | * | 5/1997 | Kim et al. | 417/269 |
| 5,960,697 A | * | 10/1999 | Hayase et al. | 92/12.2 |
| 6,155,798 A | | 12/2000 | Deininger et al. | |
| 6,406,271 B1 | | 6/2002 | Valentin | |
| 6,422,831 B1 | * | 7/2002 | Ito et al. | 417/269 |

FOREIGN PATENT DOCUMENTS

| | | | | |
|---|---|---|---|---|
| DE | 707462 | | 6/1941 | |
| DE | 707462 A | * | 6/1941 | 91/506 |
| DE | 1017468 | | 10/1957 | |
| DE | 1653617 | | 7/1971 | |
| DE | 2215764 | | 10/1973 | |
| DE | 4011737 | | 10/1991 | |
| DE | 19608228 | | 9/1997 | |
| DE | 10226492 | | 9/2006 | |
| EP | 0297928 A2 | | 1/1989 | |
| EP | 1092870 A2 | | 4/2001 | |
| FR | 1411439 | | 9/1965 | |
| GB | 751231 A | | 6/1956 | |

* cited by examiner

HYDRAULIC AXIAL PISTON MACHINE

CROSS REFERENCE TO RELATED APPLICATIONS

This application is entitled to the benefit of and incorporates by reference essential subject matter disclosed in International Patent Application No. PCT/DK2008/000349 filed on Oct. 8, 2008 and German Patent Application No. 10 2007 048 316.5 filed Oct. 9, 2007.

TECHNICAL FIELD

The invention concerns a hydraulic axial piston machine with a housing, in which a cylinder drum having at least one cylinder is arranged to be rotatable around an axis, in which cylinder is located a piston that is supported on a swashplate, whose inclination angle is adjustable in an adjustment plane.

BACKGROUND OF THE INVENTION

Such an axial piston machine is, for example, known from DE 196 08 228 A1. Here, the swashplate is formed as a section of a cylinder and lies in a correspondingly formed bearing shell. For adjusting the inclination angle, the swashplate can be tilted around an axis that extends in parallel to the axis of the cylinder.

U.S. Pat. No. 1,533,399 shows a further axial piston machine, in which the swashplate is also formed by a section of a cylinder, whose cover surface has a worm wheel toothing that engages in a worm shaft. When the worm shaft is turned, the inclination of the swashplate is changed.

SUMMARY OF THE INVENTION

The invention is based on the task of keeping the cost of manufacturing individual parts of an axial piston machine small.

With a hydraulic axial piston machine as mentioned in the introduction, this task is solved in that on the side facing away from the cylinder drum the swashplate has a spherical bearing surface, which rests on a spherical supporting surface in a bottom part of the housing and comprises an inclination protection, which counteracts an inclination of the swashplate perpendicularly to the adjustment plane.

With this embodiment, both the swashplate and the bottom part with its supporting surface can be made by means of turning. For this purpose, an element, which will eventually form the supporting surface, is simply fixed in a lathe and worked. The same applies for the bottom part. The blank required for manufacturing the swashplate is only slightly larger than the finished swashplate, that is, the material losses are relatively small. A spherical bearing surface can be inclined in all directions in a spherical supporting surface. As, however, a change of the relative alignment between the swashplate and the bottom part of the housing is only desired in one direction, the inclination protection is provided, which prevents an inclination in all other directions. For this purpose, it is sufficient, if the inclination protection can adopt forces acting perpendicularly to the adjustment plane.

Preferably, the swashplate has an asymmetric design. This is simply achieved in that a segment is removed from the swashplate, or that the swashplate is chamfered on the side opposite the bearing surface. The asymmetric design has the advantage that the swashplate does not need substantially more space than is absolutely required for the adjustability.

Preferably, a pin connected to the swashplate projects through an opening in the supporting surface, the opening having, at least in the adjustment plane a larger extension than the pin. Then, the pin can be used to adjust the inclination of the swashplate. As it projects through the supporting surface, the adjustment can be made from a position, where no other elements of the axial piston machine are interfering.

Preferably, an adjustment arrangement acts upon the pin. The inclination of the swashplate can be set manually by means of the pin. However, a larger accuracy can often be achieved, if an adjustment arrangement is used.

It is preferred that the adjustment arrangement has at least one adjusting screw. Rotation of the adjusting screw will change its position in the bottom plate. The adjusting screw acts upon the pin. The change of the adjusting screw position changes the angle alignment of the pin in relation to bottom plate and thus also the inclination of the swashplate.

Preferably, the adjustment arrangement has two adjusting screws acting upon the pin from opposite sides. Thus, the pin can be fixed in two directions, particularly between the two adjusting screws. If the angle alignment of the swashplate, that is, the inclination angle, has been set, this state can be permanently fixed by the two adjusting screws. Alternatively, an adjustment can be achieved by means of only one screw, which then acts upon the pin in two directions (pull and pressure).

Preferably, the pin is part of a locking device. Thus, the pin cannot only be used to change the inclination angle of the swashplate, but also to retain the inclination angle after a change.

It is preferred that the pin is screwed into the swashplate and comprises a head that can be clamped to the bottom part. When the swashplate has then assumed the desired inclination angle, the pin is screwed further into the swashplate, so that the head is clamped to the bottom part. In this connection, it is possible that auxiliary elements are located between the head and the bottom part, for example a washer or a support arrangement, which again comprises a pair of spherical faces, which can be displaced in relation to each other.

Preferably, the opening is surrounded by a sealing, which is located between the bearing surface and the supporting surface. The sealing then prevents hydraulic fluid from reaching the opening and thus ensures the tightness of the machine in this area.

Preferably, the inclination protection has at least one groove, which is located in one of the parts bearing surface and supporting surface, and in which at least one guide pin is guided, which is located in the other of the parts bearing surface and supporting surface. The interaction between the groove and the guide pin ensures that the swashplate can only change in relation to the bottom part of the housing in one plane. Other changes, also rotational movements of the swashplate in relation to the bottom part, are not possible.

Preferably, the guide pin is fixedly connected to the part allocated to it. This simplifies the mounting. The guide pin can, for example, be glued onto or injected into the swashplate.

Preferably, the groove is divided into at least two sections along the adjustment plane. This firstly ensures that the supporting surface or the bearing surface remains as large as possible. Secondly, the sections of the groove can also be used as inclination angle limitations, so that a too large inclination of the swashplate is avoided. If this is not required, the groove can also be continuous.

BRIEF DESCRIPTION OF THE DRAWINGS

In the following, the invention is described on the basis of preferred embodiments in connection with the drawings, showing.

DETAILED DESCRIPTION OF THE PREFERRED EMBODIMENT

Figure 1:
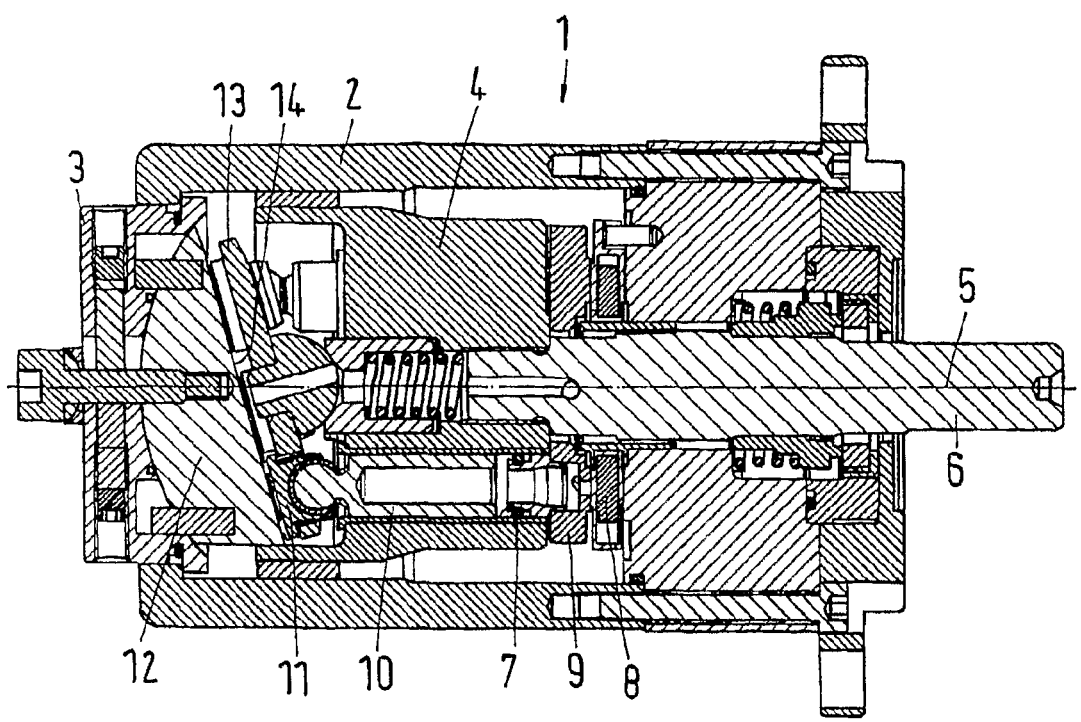
FIG. 1 is a hydraulic axial piston machine in a section.

FIG. 1 shows a hydraulic axial piston machine 1 with a housing 2 that comprises a bottom part 3. A cylinder drum 4 is rotatably supported in the housing 2. The rotation occurs around an axis 5, which is at the same time the axis of a shaft 6, which is unrotatably connected to the cylinder drum 4.

Several cylinders 7 are arranged in the cylinder drum, the axes of the cylinders 7, which are not shown in detail, being arranged eccentrically to the axis 5. Preferably, the axes of the cylinders 7 are located on a circle around the axis 5.

Via a valve plate 8, at which the cylinder drum 4 rests under insertion of slide shoes 9, the cylinders 7 are supplied with pressurised hydraulic fluid, or pressure-less fluid is discharged from the cylinders 7, when the axial piston machine works as a motor. When the axial piston machine works as a pump, pressurised fluid leaves the cylinders 7 through the valve plate 8, and fluid is sucked in through the valve plate 8, depending on the rotation angle position of the cylinder drum 4.

The sectional view of FIG. 1 divides the valve plate 8 into two halves, each having a control kidney. Therefore, these are not visible in the present sectional view.

In each cylinder 7 is arranged a piston 10, which is supported via a slide shoe 11 on a swashplate 12. Via a holddown plate 13 the slide shoes 11 are held in contact with the swashplate 12, or rather with a control surface 14 of the swashplate 12. When the cylinder drum 4 rotates, the pistons 10 are moved axially in relation to the cylinder drum 4 by the control surface 14 and the holddown plate 13. Such an embodiment of an axial piston machine 1 is known in principle.

The swashplate 12 has, on the side facing the cylinder drum 4, the plane control surface, on which the sliding shoes 11 rest, and on the side facing away from the cylinder drum 4, a spherical bearing surface 15, which rests in an accordingly spherical supporting surface 16 at the bottom part 3. The radii of the bearing surface 15 and the supporting surface 16 are adjusted to each other, so that an extensive bearing of the bearing surface 15 on the supporting surface 16 occurs. Both the bearing surface 15 and the supporting surface 16 can be made by means of turning, which is a relatively simple manufacturing process.

Figure 2:
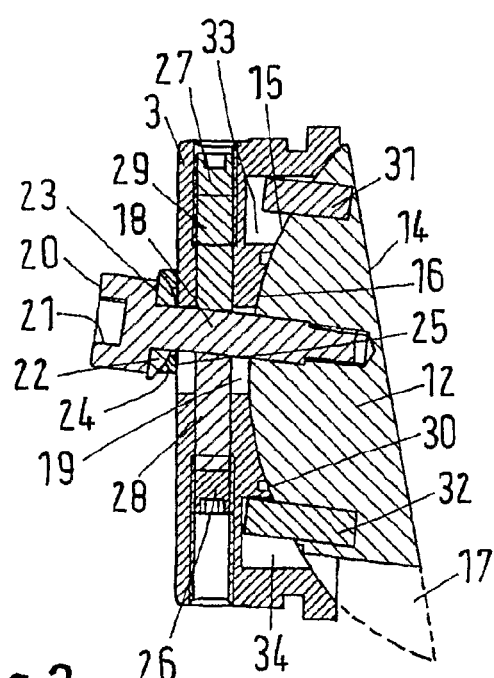
FIG. 2 is an enlarged section from FIG. 1.

As can be seen, particularly from FIG. 2, the swashplate is made to be asymmetrical, that is, at the lower end (the direction relates to the view in FIG. 2) a part 17 is missing. In this area, the swashplate 12 can be swung to its other extreme position.

A pin 18 is screwed into the swashplate 12. The pin 18 projects through an opening 19 in the supporting surface 16, so that it extends outwards from the bottom part 3. The pin 18 has a head 20, which has a torque application surface 21, for example a hexagon socket. The opening 19 is an oblong hole, that is, in one direction it has an extension, which is larger than the diameter of the pin 18. Vertically to that, the extension of the opening 19 corresponds to the diameter of the pin 18. Thus, the pin 18 only permits the swashplate 12 to swing in relation to the bottom part 3 in one direction.

The head 20 acts upon a supporting disc 22, which has a plane first surface 23 and a spherical second surface 24, the spherical surface 24 interacting with a bearing shell 25, which has a corresponding spherical surface on the side facing the supporting disc 22 and a plane surface on the part facing the bottom part 3. Accordingly, it is possible, when screwing the pin 18 into the supporting disc 22, to fix the supporting disc 22 in relation to the bottom part 3, thus retaining an already set inclination or angle position.

The pin 18 simultaneously acts as adjustment element for the inclination angle of the swashplate 12. Adjustment screws 26, 27 are inserted in the bottom part 3 from sides opposite each other, the adjustment screws 26, 27 acting upon the pin 18 via adjustment pins 28, 29. However, it is also possible that the adjustment screws 26, 27 act directly upon the pin 18. If, for example, the adjustment screw 26 is screwed somewhat out of the bottom part 3 and the adjustment screw 27 is screwed somewhat into the bottom part 3, the pin 18 is swing somewhat downwards, thus changing the inclination angle of the control surface 14 of the swashplate in relation to the axis 5.

A sealing 30 is arranged between the bearing surface 15 and the supporting surface 16, the sealing 30 surrounding the opening 19, thus preventing fluid from escaping from the inside of the axial piston machine 1 into the environment.

The embodiment of the swashplate 12 with a spherical bearing surface 15 that is supported in a correspondingly spherical supporting surface 16 in principle permits an inclination of the swashplate 12 in all directions. Also a rotational movement of the swashplate 12, for example around the axis 5, would be possible. However, it is endeavoured to ensure that the swashplate 12 can only move in an adjustment plane. In the FIGS. 1 and 2, the adjustment plane corresponds to the drawing plane. The control surface 14 extends laterally to the drawing plane and thus laterally to the adjustment plane. The inclination of the swashplate 12 and thus of the control surface 14 shall only be changeable in parallel to the drawing plane, that is, in parallel to the adjustment plane.

For this purpose, the swashplate 12 has two guide pins 31, 32, which are led through the bearing surface 15 and connected to the swashplate 12. The guide pins 31, 32 can, for example, be pressed into the swashplate 12, glued into the swashplate 12 or otherwise fixed there. The guide pins 31, 32 are guided in grooves 33, 34.

The grooves 33, 34 have a width that corresponds to the width of the guide pins 31, 32. Thus, the guide pins 31, 32 fill the grooves 33, 34 in a direction laterally to the adjustment plane, that is, laterally to the drawing plane. Along the adjustment plane, however, the grooves 33, 34 have an extension, which is larger than the corresponding extension of the guide pins 31, 32. Accordingly, together with the grooves 33, 34, the guide pins 31, 32 ensure that the inclination of the swashplate 12 in relation to the axis 5 can change in the adjustment plane, another movement of the swashplate 12, however, being impossible. Particularly an inclination of the swashplate 12 laterally to the adjustment plane is prevented.

Of course, it is also possible to arrange the guide pins 31, 32 in the bottom part 3 and the grooves 33, 34 in the bearing surface 15.

The above mentioned control kidneys have different pressures, which again attempt to incline the swashplate 12. This is prevented by the pins 31, 32, which interact with the grooves 33, 34, where they are supported at the lateral flanks.

In FIG. 1, the swashplate 12 is shown in its one extreme position, and in FIG. 2 in its other extreme position. The extreme positions, that is, the maximum or minimum possible inclination angle, respectively, occur in that the guide pins 31, 32 butt against frontside limitations of the grooves 33, 34.

Figure 3:
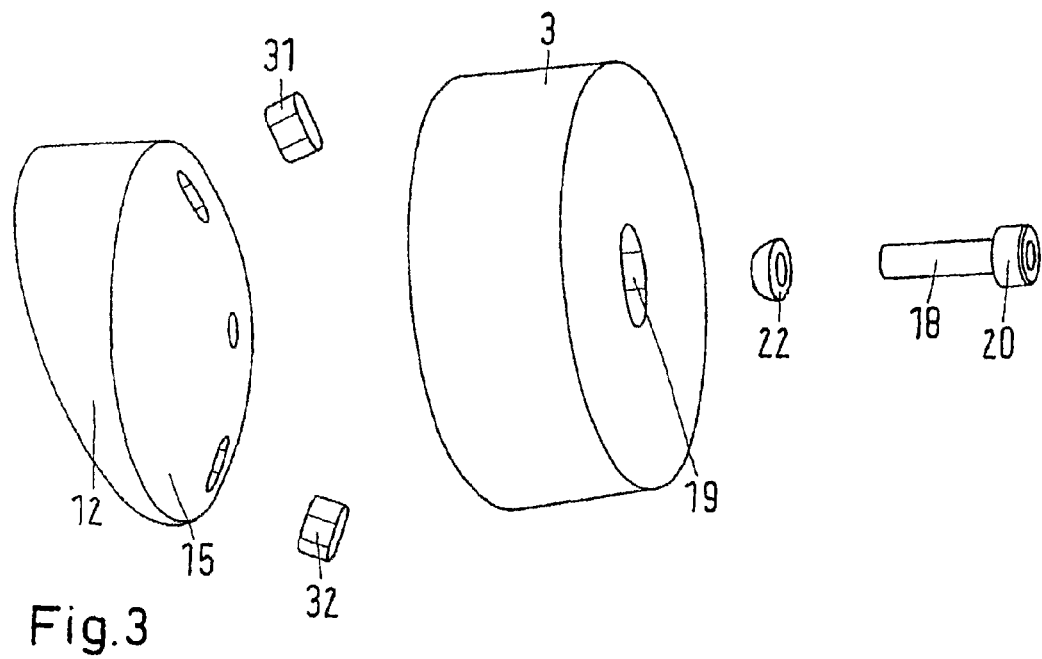
FIG. 3 is a modified embodiment of a swashplate-bottom part arrangement in a perspective view.
Figure 4:
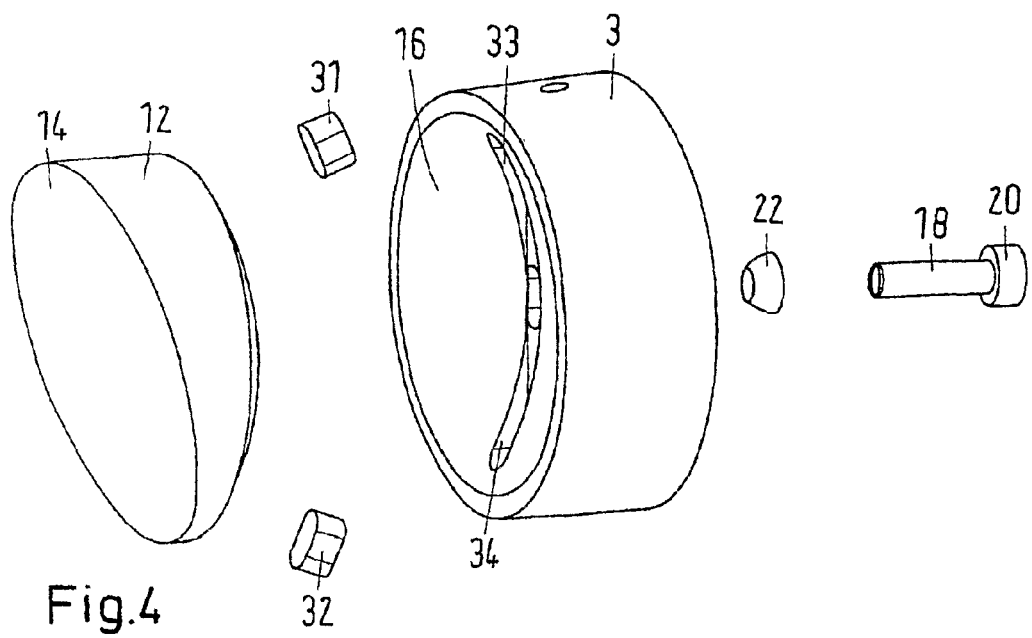
FIG. 4 is the arrangement of FIG. 3 from another visual angle.

The FIGS. 3 and 4 show perspective exploded views of a modified embodiment of the swashplate 12 and the bottom part 3, in which corresponding elements have the same reference numbers as in FIGS. 1 and 2.

It appears from FIG. 3 that the opening 19 is made as an oblong hole, so that here the pin 18 has a certain movability. The supporting disc 22 can be inserted immediately into the opening 19. A part of its circumference then projects somewhat laterally over the opening 19.

A further difference is that the grooves 33, 34 are made to be coherent in the supporting surface 16. Thus, they form a common groove.

Here, the asymmetric design of the swashplate 12 is realised in a different manner. A cylinder-shaped blank is used, which receives the spherical bearing surface 15 on its frontside. The opposite frontside of the blank is then bevelled to form the control surface 14.

Also here, the guide pins 31, 32 together with the groove 33, 34 form an inclination protection, so that the swashplate 12 is only movable in one direction in relation to the bottom part 3, namely in the direction, in which the guide pins 31, 32 can slide in the groove 33, 34.

In many cases the inclination angle of the swashplate 12 must only be varied in a small area, for example by ±3°. With the change of the inclination angle, the displacement of the axial piston machine 1 can be changed.

With the embodiments shown until now, it is not provided that the inclination angle of the swashplate 12 can be continuously changed. On the contrary, with these embodiments an inclination angle is prespecified and then changed from time to time, if a need occurs.

However, it is also possible to change the inclination angle of the swashplate 12 during operation, for example, if the adjustment screws 26, 26 are activated by a motor, or the pin 18 is otherwise displaced by a drive, for example a small electric, hydraulic or pneumatic motor. The change of the displacement, that is, the change of the inclination of the swashplate 12, can then be controlled on the basis of many parameters. If the axial piston machine 1 is used as pump in a reverse osmosis system, such parameters could, for example, be the temperature or the salt content of the water.

The guiding of the swashplate 12 in the bottom part 3 by means of the guide pins 31, 32 and the grooves 33, 34 has the advantage that also an adjustment during operation requires only little force to change the inclination angle of the swashplate 12. The reason for this is that the pressure from the piston acts relatively uniformly in both inclination directions. In principle, the adjustment arrangement only has to overcome frictional forces, which occur on the one side between the bearing surface 15 and the supporting surface 16 and on the other side between the guide pins 31, 32 and the side walls of the grooves 33, 34. Thus, the adjustment of the inclination angle of the swashplate could also be made by a motor, in which a relatively small torque is sufficient.

While the present invention has been illustrated and described with respect to a particular embodiment thereof, it should be appreciated by those of ordinary skill in the art that various modifications to this invention may be made without departing from the spirit and scope of the present.

What is claimed is:

1. An axial piston machine comprising:
a housing having a bottom part with a spherical supporting surface;
a cylinder drum rotatably arranged in the housing, the cylinder drum having at least one cylinder;
a piston located in the at least one cylinder;
a swashplate supporting the piston, the swashplate having a spherical bearing surface on a side facing away from the cylinder drum, the spherical bearing surface resting on the spherical supporting surface of the bottom part of the housing; and
an inclination protection having a plurality of grooves located in one of the spherical bearing surface and spherical supporting surface, the plurality of grooves having guide pins guided therein, the guide pins located in the other one of the spherical bearing surface and spherical supporting surface;
wherein each groove has an extension in an adjustment plane that is longer than an extension of the guide pin guided therein and a width in a direction substantially perpendicular to the adjustment plane that corresponds to a width of the guide pin so that the inclination protection allows an inclination angle of the swashplate to be adjustable in an adjustment plane while simultaneously counteracting an inclination of the swashplate in a plane substantially perpendicular to the adjustment plane; and
wherein the guide pins of the inclination protection are arranged eccentrically to an axis of the cylinder drum to substantially prevent rotational movements of the swashplate in relation to the bottom part.

2. The axial piston machine according to claim 1, wherein the swashplate has an asymmetric design.

3. The axial piston machine according to claim 1, wherein a pin connected to the swashplate projects through an opening in the supporting surface of the bottom part, the opening having a larger extension than the pin in at least the adjustment plane.

4. The axial piston machine according to claim 3, wherein an adjustment arrangement acts upon the pin.

5. The axial piston machine according to claim 4, wherein the adjustment arrangement has at least one adjusting screw.

6. The axial piston machine according to claim 5, wherein the adjustment arrangement has two adjusting screws acting upon the pin from opposite sides.

7. The axial piston machine according to claim 1, wherein the guide pins are fixedly connected to the part allocated to the guide pins.

8. The axial piston machine according to claim 1, wherein the plurality of grooves are disposed along the adjustment plane.

* * * * *